Inventor
BENGT A. JOHANSSON
By
Charles L. Johnson Jr.
Attorney

PHASE SHIFT COMPENSATING ARRANGEMENT

Filed March 6, 1967 5 Sheets-Sheet 2

Inventor
BENGT A. JOHANSSON
By Charles T. Johnson Jr
Attorney

Inventor
BENGT A. JOHANSSON
By Charles J. Johnson, Jr.
Attorney

PHASE SHIFT COMPENSATING ARRANGEMENT

Filed March 6, 1967 5 Sheets-Sheet 4

Inventor
BENGT A. JOHANSSON
By Charles L. Johnson
Attorney

Inventor
BENGT A. JOHANSSON
By Clark L. Johnson Jr.
Attorney

United States Patent Office 3,537,099

Patented Oct. 27, 1970

3,537,099

PHASE SHIFT COMPENSATING ARRANGEMENT

Bengt A. Johansson, Kallhall, Sweden, assignor to International Standard Electric Corporation, New York, N.Y., a corporation of Delaware Filed Mar. 6, 1967, Ser. No. 621,009
Claims priority, application Sweden, Mar. 8, 1966, 3,041/66
Int. Cl. G08c 9/04
U.S. Cl. 340—347 4 Claims

ABSTRACT OF THE DISCLOSURE

A method and apparatus for compensation of the phase shift of a synchro resolver or transducer between the signal supplied to the primary side and the signal extracted from the secondary side. The compensation is by a binary number proportional to the undesired shift which is transferred to means which make the adjustment.

Figure 1:
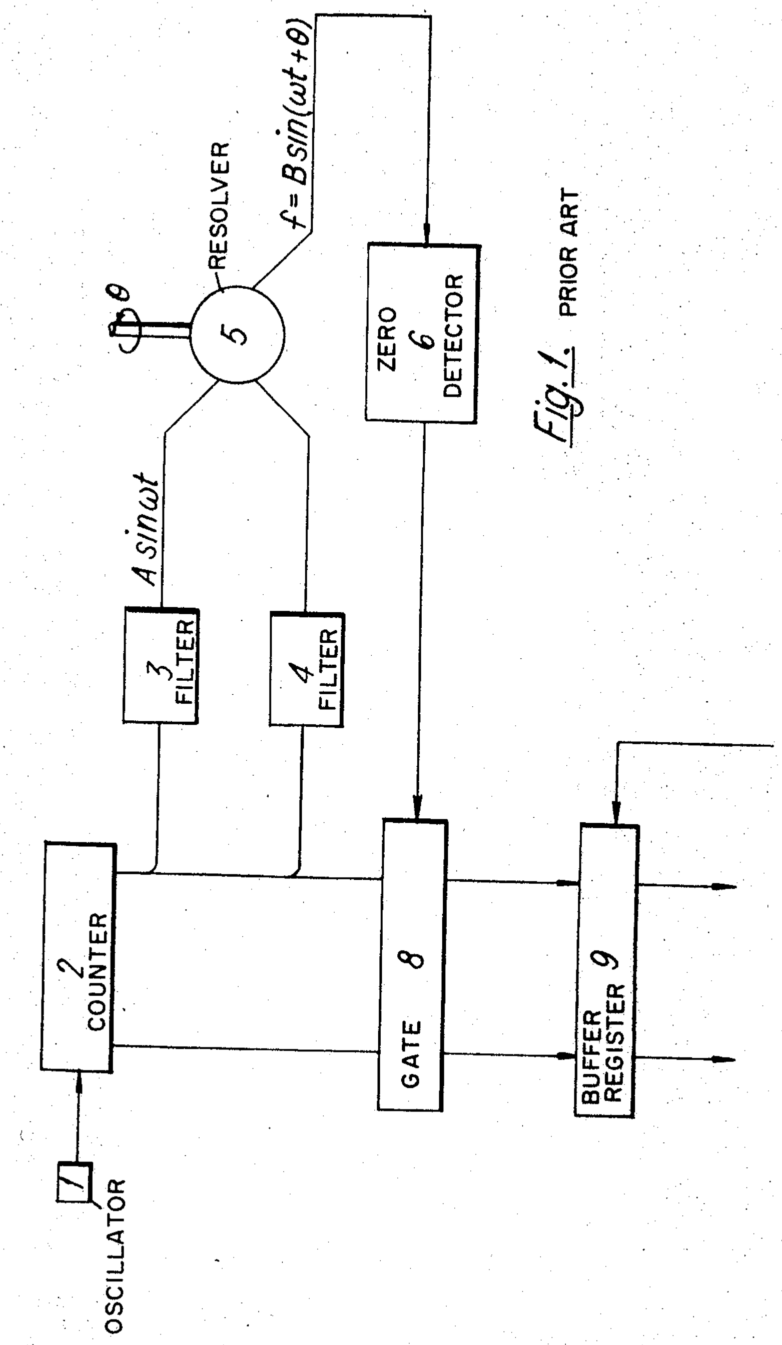

In applications with synchro resolvers or other types of synchro units or transducers for data processing, data transmission or data extraction, it is often necessary that the phase shift occurring in the synchro element or transducer between the signal supplied to the primary side and the signal extracted from the secondary side be known controlled, and compensation provided. One problem is that said phase shift often is dependent on some uncontrollable external or internal parameter, for instance temperature, and varies therewith. Therefore, a phase shift compensation that is carried out under certain conditions, for instance at room temperature, will not have an acceptable compensating effect under other conditions, for instance at high or low temperatures.

A conventional method of correcting this has been to introduce a phase changing effect in the opposite direction to the effect occurring at the synchro element by means of another device, the effective qualities of which also vary with changes in the same parameter that give the unfavorable effect to the phase shift. This has resulted in different types of so-called buffer amplifiers or standardized networks for resolvers with or without individual feedback windings or for synchro elements of other types. These methods give acceptable results for moderate requirements of accuracy with respect to the given phase shift conditions, but with increased requirements in this respect the known devices have proved to be insufficient.

The instant invention thus refers to a method for performing—in data processing, data transmission or data extraction utilizing resolvers or other types of synchros, transducers (potentiometers, etc.) or other components in electronic systems—adaptive compensation or for making possible such compensation of undesired phase shifts caused by said elements. In the method of the invention, the binary digits are proportional to the undesired phase shift and derived from a binary digit generator or their analog counterparts are manually or automatically registered, or are transferred to means which adjust the measured values or the computation quantities, or are utilized directly for compensation, respectively. An arrangement for performing the method of the invention is characterized in that a gating or switching system is adapted to continuously, or during an interruption in the normal data processing procedure, supply said resolvers or other elements with an alternating current signal of a definite phase originally controlled from a binary digit generator; with a connected pulse generator and to simultaneously disconnect other primary signals that may have some other phase, and to connect over a function quantity and function direction sensing detector to another gating system. The binary digit generator is adapted to occasionally or regularly transfer to a register, memory or phase compensating means a digital number representing the momentary phase shift in the resolvers or said elements.

Figure 2:
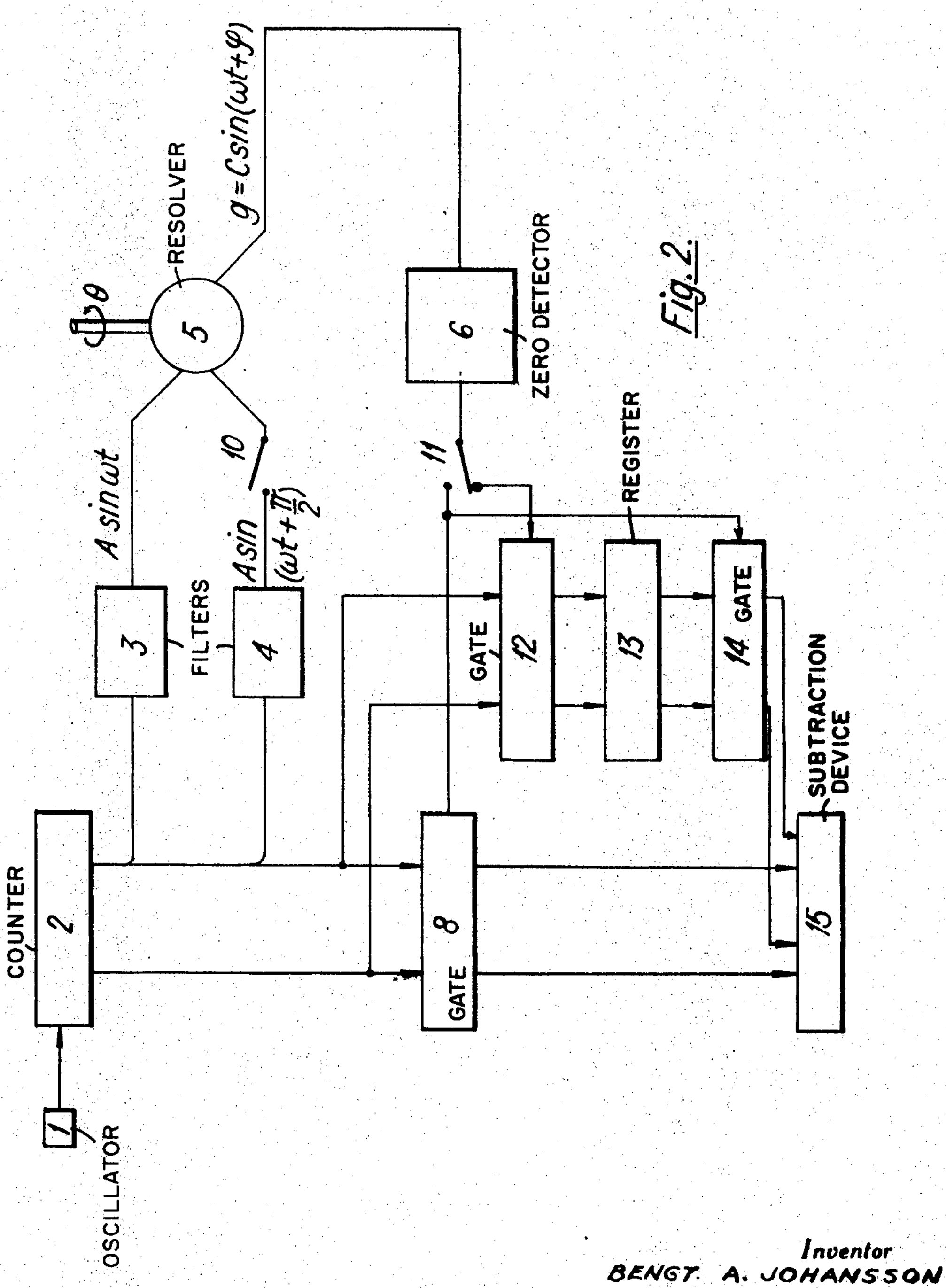
Figure 3:
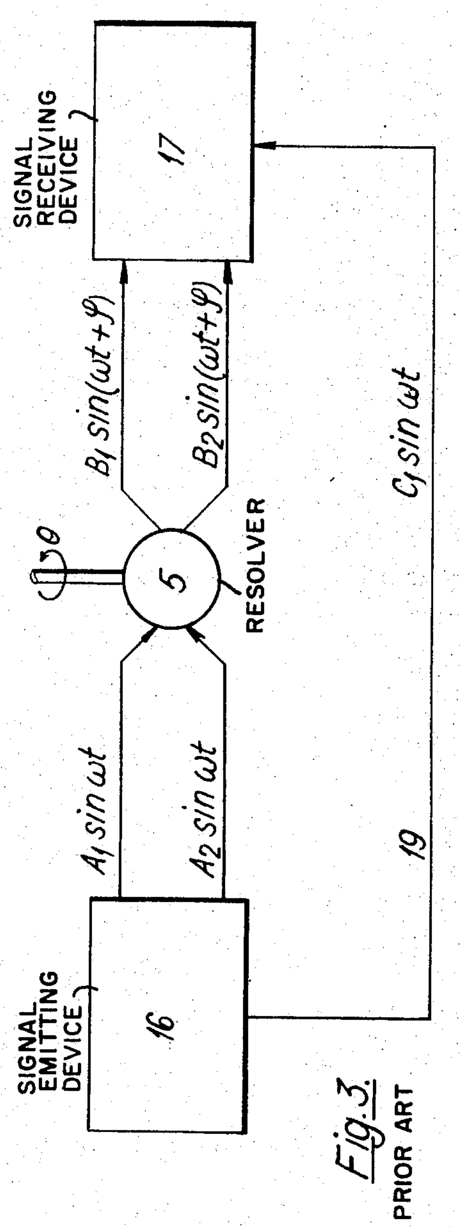
Fig.3 PRIOR ART
Figure 4:
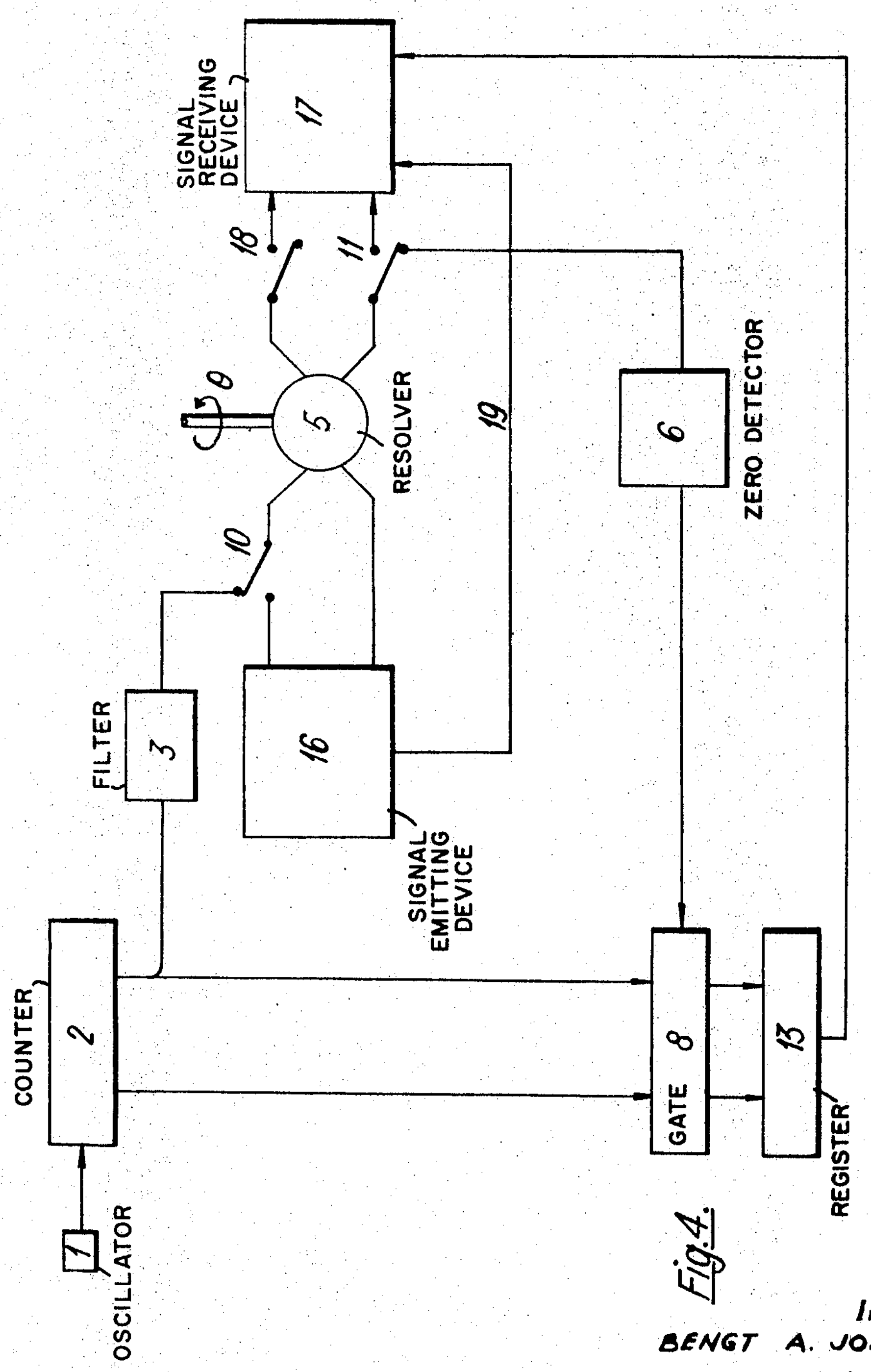
Figure 5:
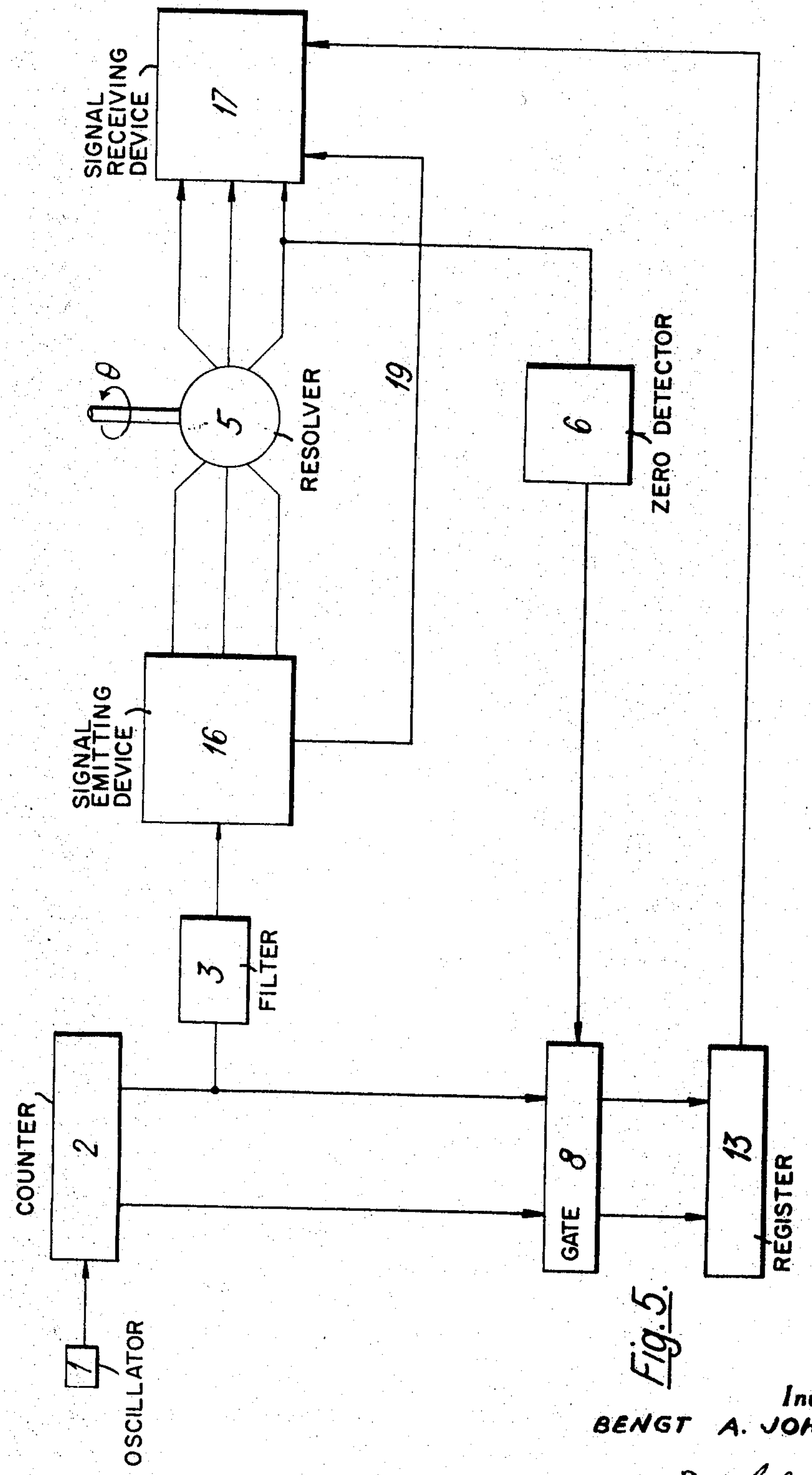

The invention will be described more in detail below with reference to the accompanying drawings, in which FIGS. 1 and 3 illustrate previously known arrangements with resolvers, wherein undesired phase shifts may occur; and FIGS. 2, 4 and 5 show embodiments in which the principles of the invention have been applied and in which undesired phase shifts have been eliminated.

FIG. 1 illustrates a known method which is utilized to give an indication of the angle of rotation $\theta$ of a shaft and refers to ideal conditions. In this case, a comparatively stable oscillator 1 generates a pulse train, which evenly and uninterruptedly steps on a digital counter 2. When said counter has been filled, for instance after 8192 counted pulses for a 13-bit counter, it will shift to its zero position as a result of the next incoming pulse and will immediately start counting again. In this manner the counter will be continuously shifted. The most significant digit in the counter will then be shifted at a frequency falling below the incoming pulse frequency by a factor bearing a definite relationship to the size of the counter. With for instance 3.2 mc./s. as the input frequency the behaviour of the most significant digit in a 13-bit counter will correspond to a rectangular wave having a frequency of approximately 400 c./s. The output signal from digital counter 2 is supplied to two filters 3 and 4 operating in such manner that the sine and cosine, respectively, of the fundamental of the signal will be formed. These two signals are supplied to the two primary windings of a synchro resolver 5 at right angles to each other. As readily understood, a signal with its phase position proportional to the angle of rotation $\theta$ of the rotor shaft will then occur a secondary winding of the resolver. This signal $f=\beta$ sine $(\omega t+\theta)$ is now supplied to a zero detector 6, in which a zero crossing in each period of $f$ is indicated by a signal, which instantaneously opens an electronic gate 8. The binary digit that at the moment is present in counter 2 and that represents the rotational position of the shaft of the revolver will immediately be transferred to a buffer register 9. In this register there will be set a binary number which is an indication of the rotational position of the shaft to which the resolver is connected. From the buffer register 9 the value of the binary number may be transferred to a digital computer or directly to some other device in the data processing equipment when required.

However, as the conditions never are ideal, there will always be an additional parameter in the argument of the function $f$, viz. a phase shift $\varphi$ caused by the resolver itself. The function $f$ will then have the form of $f=(\omega t+\theta+\varphi)$, and the value stored in the buffer register will then be incorrect, since it will not be an indication of solely the rotational position of the shaft but of the sum of the angle $\theta$ corresponding to this rotational position and the phase shift $\varphi$. As $\varphi$ in addition generally is responsive to temperature, a compensation performed by conventional methods will be fully satisfactory only at a definite temperature.

The invention refers to a principally simple arrangement for automatic compensation on the phase shift $\varphi$ and its dependency of certain parameters, for instance temperature. This arrangement will be described with reference to FIG. 2, which is similar to FIG. 1 but with the addition of a simple form of the arrangement of the invention. In the line between filter 4 and resolver 5 an electronic gate or switch 10 has been introduced. At certain time intervals or whenever necessary this gate is set into such a position, that the signal from the filter 4 is blocked. The resolver will then only obtain the signal $A \sin \omega t$ on the primary side. On the secondary side a signal $g=C \sin (\omega t+\varphi)$ will occur, wherein the rotor position $\theta$ is not included in the argument. While gate 10 blocks the signal from filter 4, another gate 11 is set so, that the signal from the zero detector 6 will transfer the value corresponding to $\varphi$ in counter 2 to a register or memory 13 through a gate 12. In this manner the binary number corresponding to $\varphi$ will be stored in register 13. In subsequent measurements gate 10 is set so, that the signal from filter 4 will not be obstructed, and gate 11 is set so that the signal from zero detector 6 will actuate gate 8 and also gate 14. At the zero crossing, the binary number corresponding to $\theta+\varphi$ from counter 2 and the binary number corresponding to $\varphi$ from register 13 will be supplied to a substraction device 15 with a register, in which device the value $\varphi$ is subtracted from the value $\theta+\varphi$ and the result $\theta$ is stored. By the arrangement described, the independency of the phase shift $\varphi$ that varies in an unknown manner is attained.

However, the device described in connection with FIG. 2 is a specific case, which may be generalized as described below. Filters 3 and 4 may be replaced by a sine and cosine generator, respectively, which under the control of counter 2 generate siganls $A \sin t$ and $A \sin (\omega t+\pi/2)$. Gate 10 may be replaced by several gates and switches connected between filters 3 and 4, and resolver 5 with the result that the signal $A \sin \omega t$ at the compensating readout of $\varphi$, described above with reference to FIG. 2, may be connected to one or more of the primary windings of the resolver or the synchro unit simultaneously. This generalization makes it possible to place the alternating field corresponding to $A \sin \omega t$ in an appropriate direction in the resolver or to let it alternate between two or more directions during successive readouts of $\varphi$. It is also possible to select one of the secondary windings by means of a gating system at the output side of the resolver or synchro element, or to alternate between two or more of these for successive readouts.

Gate 10, or the corresponding gating system described above, may be positioned in front of or inside of filters 3 and 4 or their more general counter part described above. This generalization permits adapting the alternating field of the resolver to the rotor position at readout of $\varphi$. In utilizing known digital-analog converters after a sine and cosine generator of the above-mentioned the task intended for gate 10, or the corresponding switching or gating system, may be completely or partly taken over by gating systems at the inputs of the digital-analog converter.

For one and the same measure quantity, i.e. shaft position $\theta$, resolver 5 may be replaced by two or more resolvers, which form a system for coarse and fine marking, wherein the subsequent data channels also may be partly doubled or multiplied, respectively. Each parallel branch in a coarse and fine marking arrangement, respectively, of this type has principally the same design and mode of operation that has been described with reference to FIGS. 1 and 2. Resolver 5 may also be provided with one or more windings which make possible one or more electric shifts upwards, whereby the above-mentioned coarse and fine marking arrangement of mechanical type will be replaced by a corresponding electric arrangement. This is a known design for resolvers and synchro units. The signal processing is the same in this case for each branch in the coarse and fine marking arrangements, respectively, and the phase compensating arrangement of the invention may be used in one or more of these branches. All the above-mentioned designs may with or without modifications of the principle, be utilized in arrangements where the resolver or the resolvers have been replaced by synchro units or synchro devices of other types.

The design of a zero detector 6 is not essential to the invention and it has therefore not been described in detail.

When the signal derived from resolver 5 passes a certain function value, unit 6 is to deliver a signal that actuates one or more gates or switches. As a rule, a zero detector giving a sharp pulse exactly when the signal passes through the value zero would be utilized here.

The digital portions 2, 8, 12, 13, 14 and 15 may entirely or partly comprise one or more parts of a digital computing device of general or specific type.

Both the normal measuring procedure and the phase compensating process of the invention may be either manually or automatically controlled. In automatic control, clock pulse generators and program logic may be positioned inside or outside the computing device in question.

The mode of operation of the invention has been described above with reference to the specific use of a synchro unit or a resolver which provides a rotating alternating field in the iron core and a phase position of the signals derived on the secondary side proportional to the angular position of the rotor—ideally taken. FIG. 3 illustrates a generalized version of a more conventional method of utilizing a resolver or some other synchro unit. It is characteristic for this mode of utilization that the amplitudes of the alternating voltages represent the mean values of the quantities, where as the phase position of the carrier only indicates a positive or negative sign for the mean value of the respective quantity. A portion of the arrangement, in this case, called the signal emitting device 16, delivering alternating currents having the amplitudes $A_1$, $A_2$ and the angular frequency $\omega t$ to the resolver 5. The resolver delivers the alternating voltage amplitudes $B_1$, $B_2$ etc., which are responsive to the rotor position $\theta$, to another portion of the equipment, a signal receiving device 17. In the signal emitting device 16 and the signal receiving device 17 other computing operations are also performed, such as additions, multiplications etc. or detection for direct current representation. It is then unavoidable that signals are carried between the two devices 16 and 17 over some other way than the resolver 5, with the result that the phase shift $\omega$ in the carrier caused by the resolver or synchro unit will result in a fault in the computations or the processing when signals of different phases are mixed.

As may be seen from FIG. 4 the instant invention may be utilized for adaptive phase compensation. During a short interruption in the normal computations in progress, solely the arrangement described above for measuring and registering the phase shift $\varphi$, which is not proportional to $\theta$, is connected by switching the gates 10, 11 and 18. This equipment consists of oscillator 1, counter 2, filter 3, gates 10, 11 and 18, zero detector 6, gate 8 and a $\varphi$-register 13, may be modified or generalized in the manner described above. It is characteristic that a value of $\varphi$ is obtained, which is introduced into the continued data processing procedure, in this case into the signal receiving device 17, where it may be utilized for compensating the phase shift caused by the synchro element or the fault arising from said phase shift in the data processing. In certain cases one or more of the devices 1, 2, 3, 6, 8 or 13 utilized in measuring the phase will comprise portions of the liquid emitting or receiving devices and will then have some other function during the interruption. Particularly, as is illustrated by FIG. 5, the alternating voltage signal generated by oscillator 1, digital counter 2, and filter 3 or the corresponding alternative and general devices mentioned above may be utilized as carriers in a system with conventional analog data processing in and around synchro unit or resolver 5. In this case the phase shift caused by the synchro unit and the resolver, respectively, may continuously (once per carrier cycle) be read out and registered or directly utilized for compensating the fault emanating from the undesired phase shift.

The arrangement of FIGS. 4 and 5 may be generalized and modified for instance in the manner described with reference to FIG. 2.

The invention has been described above with reference to resolvers or synchro elements, but it may also be utilized in connection with other transducers or system components, in which an undesired phase shift in a signal is to be compensated or registered.

I claim:

1. A phase shift compensating arrangement comprising:
- a digital counter;
- an oscillator coupled to step on said counter;
- a resolver including two primary windings and a secondary winding;
- means coupling said counter to said primary windings and forming two alternating voltage signals which are phase shifted 90° with respect to each other and respectively coupled to said primary windings;
- a zero detector coupled to receive a secondary alternating voltage signal from said secondary winding;
- a subtraction device;
- a first gate coupling said counter to said device;
- a second gate coupled to said counter;
- registering means coupling said second gate to said device; and
- switching means to selectively disconnect one of said primary windings and to connect the output of said zero detector to said first gate and register means, or to said second gate,
- whereby the binary number corresponding to the undesired phase shift is coupled from said register means to said device, the binary number corresponding to the angle of rotation of the resolver shaft and the phase shift is coupled from said first gate to said device, and the resultant angle of rotation of the resolver shaft is obtained from said subtraction device.

2. The arrangement of claim 1 wherein said coupling means include a sine and cosine generator.

3. The arrangement of claim 2 wherein said registering includes a register and a following coupled gate, said following gate is coupled to said device and has an input to receive the output signal from said zero detector simultaneously with said first gate.

4. The arrangement of claim 3 wherein said switching means includes a first switch to selectively disconnect said cosine generator from said one primary winding, and a second switch to selectively connect the output of said zero detector to said first or second gate.

References Cited

UNITED STATES PATENTS

| | | | |
|---|---|---|---|
| 3,226,710 | 12/1965 | Tripp | 340—347 |
| 3,231,885 | 1/1966 | Blauvelt et al. | 340—347 |
| 3,238,361 | 3/1966 | Frisch | 235—154 |
| 3,247,504 | 4/1966 | Emmerich | 340—347 |
| 3,277,461 | 10/1966 | Selvin | 340—347 |
| 3,343,053 | 9/1967 | Toscano et al. | 318—20 |
| 3,402,356 | 9/1968 | Harbour | 328—155 |

MAYNARD R. WILBUR, Primary Examiner

C. D. MILLER, Assistant Examiner